(12) United States Patent
Randhawa et al.

(10) Patent No.: US 11,282,023 B2
(45) Date of Patent: Mar. 22, 2022

(54) QUALITY SCORE FOR A FOOD SUPPLY CHAIN

(71) Applicant: International Business Machines Corporation, Armonk, NY (US)

(72) Inventors: Sukanya Randhawa, Bangalore (IN); Ranjini Bangalore Guruprasad, Bangalore (IN); Anush Sankaran, Bangalore (IN); Praveen Jayachandran, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 424 days.

(21) Appl. No.: 16/238,774

(22) Filed: Jan. 3, 2019

(65) Prior Publication Data

US 2020/0219034 A1     Jul. 9, 2020

(51) Int. Cl.
*G06Q 10/06* (2012.01)
*G06Q 50/02* (2012.01)
*G06N 20/00* (2019.01)

(52) U.S. Cl.
CPC ....... *G06Q 10/06393* (2013.01); *G06N 20/00* (2019.01); *G06Q 10/06395* (2013.01); *G06Q 50/02* (2013.01)

(58) Field of Classification Search
CPC ........ G06Q 50/02; G06Q 10/06; G06Q 10/08; G06Q 10/063; G01N 33/02; G09B 19/0092
See application file for complete search history.

(56) References Cited

U.S. PATENT DOCUMENTS

| 6,874,000 B2 | 3/2005 | Sholl et al. |
| 7,412,461 B2 | 8/2008 | Sholl et al. |

(Continued)

FOREIGN PATENT DOCUMENTS

| AU | 2018101359 A4 * | 10/2018 | |
| CN | 108346059 A   * | 7/2018  | |
| EP | 3540662 A1    * | 9/2019  | ......... G06Q 10/0833 |

OTHER PUBLICATIONS

Aitken, Roger. IBM & Walmart Launching Blockchain Food Safety Alliance in China with Fortune 500s JD.com. Dec. 14, 2017. from www.forbes.com.*

(Continued)

*Primary Examiner* — Johnna R Loftis
(74) *Attorney, Agent, or Firm* — Ference & Associates LLC

(57) ABSTRACT

One embodiment provides a method, including: obtaining, for each step in a food supply chain, information corresponding to extraneous factors, wherein the extraneous factors comprise factors that may affect quality of a food product within the food supply chain; generating a rating, for each step in the food supply chain, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors to determining a rating; generating, using the rating for each of the steps, an aggregate food supply chain score for the food product, (Continued)

wherein the aggregate food supply chain indicates an impact of pollution across the food supply chain on the food product; and producing a quality rating for the food product.

16 Claims, 3 Drawing Sheets

(56) References Cited

U.S. PATENT DOCUMENTS

| | | | |
|---|---|---|---|
| 9,165,271 | B2 | 10/2015 | Dlott et al. |
| 9,697,483 | B2 | 7/2017 | Dlott et al. |
| 2006/0161392 | A1 | 7/2006 | Sholl et al. |
| 2012/0109789 | A1* | 5/2012 | Bhatt .................. G06Q 10/063 705/29 |
| 2014/0046722 | A1 | 2/2014 | Rosenbloom et al. |
| 2015/0100358 | A1 | 4/2015 | Klavins |
| 2016/0267432 | A1* | 9/2016 | Hodges .............. G06Q 10/0833 |
| 2018/0276597 | A1* | 9/2018 | Fuller ................... H04L 9/3247 |
| 2018/0284093 | A1* | 10/2018 | Brown .................... H04W 4/35 |
| 2018/0285810 | A1* | 10/2018 | Ramachandran ....... G06F 16/27 |
| 2019/0303374 | A1* | 10/2019 | Doble ................... G06F 16/284 |
| 2019/0305932 | A1* | 10/2019 | Townsend ............. H04L 9/0637 |
| 2020/0410662 | A1* | 12/2020 | Jha ....................... G06T 7/0004 |

OTHER PUBLICATIONS

Gelski, Jeff. Access to IBM blockchain-based food system expands globally. Oct. 8, 2018. from www.foodbusinessnews.net.*

McDermott, Brigid. Improving confidence in food safety with IBM Blockchain. Sep. 5, 2017. from www.ibm.com.*

Mermelstein, Neil. The Benefits of Blockchain. May 1, 2018. from www.IFT.org.*

Unuvar, Merve. The food industry gets an upgrade with blockchain. Jun. 15, 2017. from www.ibm.com.*

Wolfson, Rachel. Understanding How IBM and Others use Blockchain Technology to Track Global Food Supply Chain. Jul. 11, 2018. from www.forbes.com.*

Weiser, Armin A., Thons, Christian, Filter, Matthia, Falenski, Alexander, Apple, Bernd, and Kasbohrer, Annemarie. FoodChain-Lab: A Trace-Back and Trace-Forward Tool Developed and Applied During Food-Borne Disease Outbreak Investigations in Germany and Europe. PLos One. (Year: 2016).*

Tse, Daniel, Zhang, Bowen, Yang, Yuchen, Cheng, Chenli, Mu, Haoran. Blockchain Application in Food Supply Information Security. (Year: 2017).*

* cited by examiner

QUALITY SCORE FOR A FOOD SUPPLY CHAIN

BACKGROUND

With a heightened interest in the chemicals used to maximize crop growth and production, consumers are becoming more conscious regarding consumed products. Since the term genetically modified organisms (GMOs) has become a normal household phrase, the drive to find a product that is not affected by chemicals has become very common. Since consumers often attempt to find the most organic products, or a product with the least amount of chemical influence, agriculturists have changed how they grow and supply food. The increasing demand of non-mutated, chemical-free food products has forced agriculturists to designate more land and time to the natural growing processes of certain products. Producing fully organic food products takes more time and does not yield as much edible food as the GMO-influenced products, resulting in a price increase. Thus, the consumption of genetically modified organisms remains for those people who cannot afford a price increase. However, these consumers still care about what they are eating and would prefer to consume food products that are produced with fewer chemicals.

Contamination of food does not end with the chemicals used in the growing process. Contamination can be present at every step of a food supply chain. Natural factors such as weather, soil and air pollutants, storage conditions and delivery, and even a space where a product is set for retail can cause a product to become contaminated. These multiple areas along the food supply chain may have a larger impact on the quality of product as compared to the cultivation process.

BRIEF SUMMARY

In summary, one aspect of the invention provides a method comprising: obtaining, at a central database and for each step in a food supply chain, information corresponding to extraneous factors, wherein the extraneous factors comprise factors that may affect quality of a food product within the food supply chain; generating a rating, for each step in the food supply chain and from the information, indicating a level of pollution to which the food product was exposed to at the corresponding step, wherein the rating comprises (i) scoring each of the extraneous factors based upon a level of pollution identified from the extraneous factors and (ii) aggregating the scores for the extraneous factors to determining a rating; generating, using the rating for each of the steps, an aggregate food supply chain score for the food product, wherein the aggregate food supply chain indicates an impact of pollution across the food supply chain on the food product; and producing a quality rating for the food product, wherein the quality rating is based upon the assessed impact of pollution and indicates a quality of the food product with respect to the food supply chain.

Another aspect of the invention provides an apparatus, comprising: at least one processor; and a computer readable storage medium having computer readable program code embodied therewith and executable by the at least one processor, the computer readable program code comprising: computer readable program code configured to obtain, at a central database and for each step in a food supply chain, information corresponding to extraneous factors, wherein the extraneous factors comprise factors that may affect quality of a food product within the food supply chain; computer readable program code configured to generate a rating, for each step in the food supply chain and from the information, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors to determining a rating; computer readable program code configured to generate, using the rating for each of the steps, an aggregate food supply chain score for the food product, wherein the aggregate food supply chain indicates an impact of pollution across the food supply chain on the food product; and computer readable program code configured to produce a quality rating for the food product, wherein the quality rating is based upon the assessed impact of pollution and indicates a quality of the food product with respect to the food supply chain.

An additional aspect of the invention provides a computer program product, comprising: a computer readable storage medium having computer readable program code embodied therewith, the computer readable program code executable by a processor and comprising: computer readable program code configured to obtain, at a central database and for each step in a food supply chain, information corresponding to extraneous factors, wherein the extraneous factors comprise factors that may affect quality of a food product within the food supply chain; computer readable program code configured to generate a rating, for each step in the food supply chain and from the information, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors to determining a rating; computer readable program code configured to generate, using the rating for each of the steps, an aggregate food supply chain score for the food product, wherein the aggregate food supply chain indicates an impact of pollution across the food supply chain on the food product; and computer readable program code configured to produce a quality rating for the food product, wherein the quality rating is based upon the assessed impact of pollution and indicates a quality of the food product with respect to the food supply chain.

A further aspect of the invention provides a method, comprising: obtaining, from one or more sources, information identifying factors related to an environment of a food product within a supply chain, wherein the factors may affect the quality of a food product within a supply chain; producing, from the information, a rating indicating a level of pollution to which the food product was exposed for each step within the supply chain, wherein the rating comprises (i) scoring each of the factors based upon a level of pollution identified with the environment from the information and (ii) aggregating the scores for the factors to determining a rating; generating an aggregate food supply chain score for the food product from the ratings for the steps within the supply chain, wherein the aggregate food supply chain score indicates impact of pollution on the food product across the supply chain; and generating a provenance for the food product, wherein the provenance comprises (i) a quality rating for the food product based upon the aggregate food supply chain score and (ii) information indicating pollution of the food product across the food supply chain.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
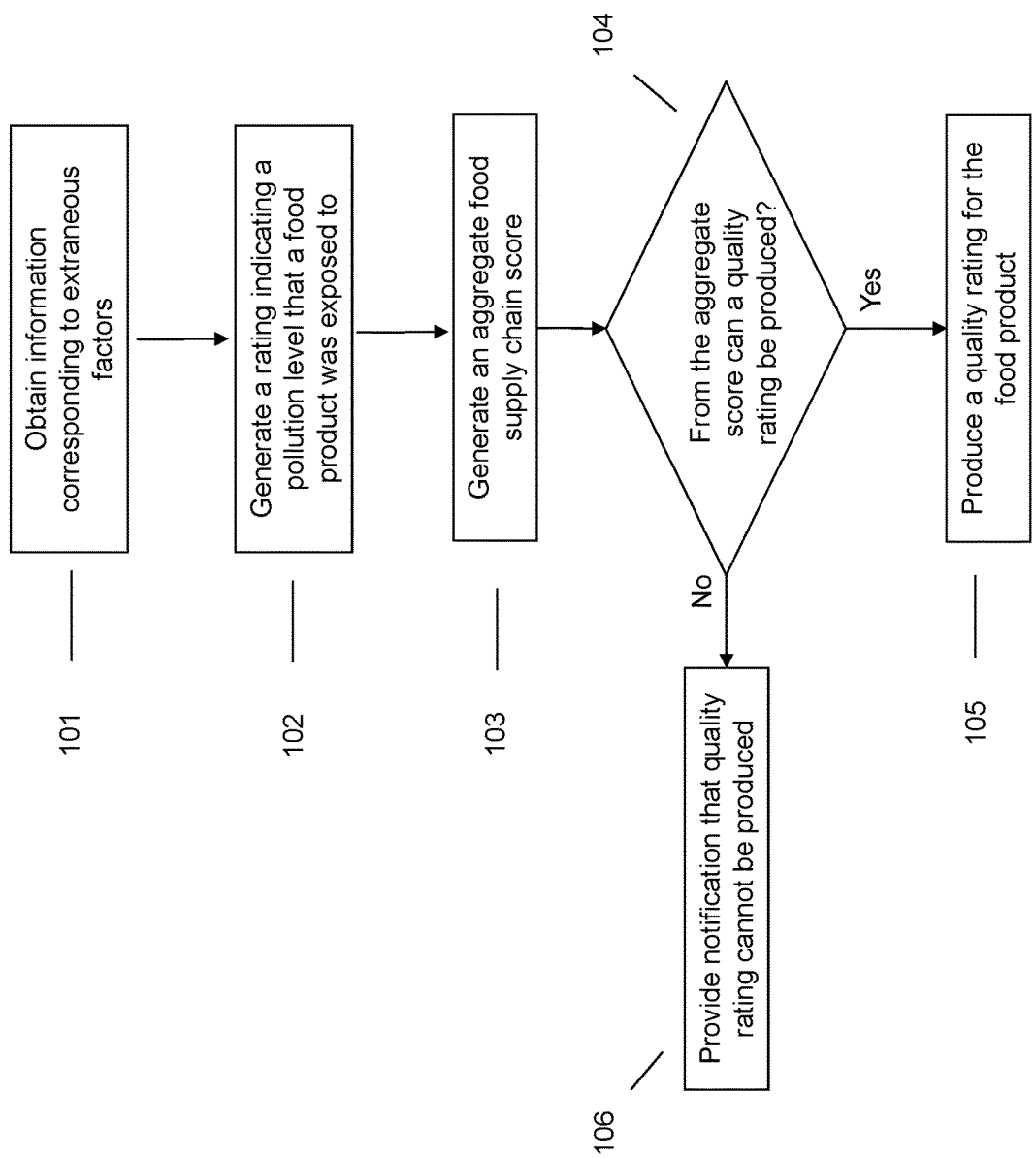
FIG. 1 illustrates a method for tracking a food product throughout the supply chain of the food product.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Food product supply chain is a multi-step process that may contain exposure to a variety of different environments. Where the product is cultivated may be half-way around the world from where a consumer may eat that product. Thus, the supply chain process may be a global process, resulting in a product being stored and shipped for long periods of time. If storage and transportation conditions are neither correct nor held constant, food products may go bad during travel. Additionally, during the cultivation and transportation to the end location where the consumer can purchase the product, the product may be exposed to many different factors that can affect the quality of the food product. Being that a food product is going to be consumed, a consumer may move with caution when purchasing a product.

Current conventional solutions allow a consumer to learn the provenance of the food product along the supply chain. The supply chain consists of the points from cultivation to end-location where the product is grown, transported, stored, and the like. Thus, the provenance identifies where a product came from and locations where the product is checked-in, for example, at sorting facilities, storage facilities, and the like. However, there is no information provided to a consumer related to the possible contamination to which a food product may be exposed through the supply chain. In other words, information regarding the chemicals used in the cultivation process are not provided, neither are transportation methods, nor, arguably of most importance, storage information for a product. Additionally, during the supply chain a food product may be exposed to pollution or other contaminants that are not recorded.

Contamination information is not supplied to the consumer who will be purchasing and consuming the possibly contaminated product. Thus, the current processes through which a consumer may go before consuming a food product are not enough to determine if a product has been contaminated. For example, when a consumer purchases a watermelon, he/she may inspect the rind for dings and marks, determine the country of origin, and identify if any recalls regarding the product exist, but be unable to determine any additional information about the quality of the product. In other words, there is no way for a consumer to know that the watermelon may have been grown in toxic soil, or that, during transportation, the crate holding the watermelon was kept at an incorrect temperature. Thus, when a consumer cuts open the watermelon, he/she might be surprised to learn that it is rotted, mushy, and smells horrible. Alternatively, the watermelon may look fine after cutting it open, but after consumption may make the consumer sick.

Accordingly, the techniques and systems as described herein provide a system and technique for tracking a food product throughout the supply chain of the food product. The system obtains information corresponding to extraneous factors that may affect a quality of the food product within the supply chain. For example, the system may access a newspaper corresponding to the location of cultivation and determine that the area suffered a flood which may have affected the quality of the soil in the area. The information collected to determine these extraneous factors may be issues due to human error, for example, spilling a substance, shortage of power to a cooler, neglect, or the like. The information collected may also be dependent on factors outside of human control, for example, temporal data (weather), textual data (news, crowd-sourced data, hospital records), discrete data (water quality index, land quality index, air quality index), and the like.

The information is obtained for each step within the supply chain process. Thus, the system can generate a rating at every node of the food product supply chain, where each node corresponds to a step within the supply chain process. In other words, throughout the supply chain process, extraneous factors, or possible factors that may contribute to contamination, are recorded at particular instances to provide information about possible hazardous conditions to which the food product may be exposed. The collected information regarding extraneous factors may then be given a score based upon a level of pollution identified from the extraneous factors. This score may be the basis of the rating for the corresponding step. In the event that multiple extraneous factors occur at a single step, the system may aggregate the factors to produce the rating. Thus, utilizing all the information provided, and generating an extraneous impact score for each situation, may then be combined to produce an aggregate rating for each node.

The system can then generate an aggregate food supply chain score for the product. This aggregate food supply chain score corresponds to an overall supply chain score that reflects the impact of pollution on the food product across the entire food supply chain. From this aggregate food supply chain score, the system can produce a quality rating for the food product. This overall quality rating can provide an indication to a consumer as to how much pollution or contamination the food product may have been exposed to during the supply chain, thereby providing the consumer, or other person, a confidence in the product being purchased.

Such a system provides a technical improvement over current systems for tracking a food product throughout the supply chain. Rather than simply being able to determine locations where the product was located, as provided in conventional systems, the described system provides for more information regarding extraneous factors that may have affected the quality of the product. Since the system may use a cognitive engine to identify and assess the overall impact of pollution on food, a consumer may reference the extraneous factor scores when purchasing food, and an agriculturist does not have to manually input extraneous factor information or calculate an extraneous factor score, which would be tedious and is not done with conventional methods at all. Rather, the cognitive engine is able to acquire the majority of information necessary to produce an accurate extraneous factor score.

Additionally, since an aggregate rating is provided for each node along a food supply chain, the system or a user may be able to locate and determine what issues arose that may have contaminated a product. The described system allows for partial computation of pollution on food by different entities if information is missing from a particular supply chain node, for example, if privacy concerns prevent sharing of pollution data and impact on food to a central entity for analysis. Also, by using this technique, a system may recognize patterns of possible extraneous factors at specific locations, which may allow for people to take actions at the location to keep the issues from reoccurring. The use of a cognitive engine may allow temporal, textual, and discrete information to be input into a system by use of a cloud-based network. In other words, the extraneous factors can be automatically obtained by the system without requiring manual input. A cognitive engine may also produce information regarding issues occurring repeatedly along the food supply chain, as previously mentioned. Additionally, a cognitive engine may calculate the extraneous impact rating in real-time. Thus, utilization of the cognitive engine allows the system to provide the most accurate extraneous impact rating for each node.

Additionally, once a food product reaches the end of its food supply chain, an aggregate extraneous impact rating may be provided. The aggregate extraneous impact rating may provide all interested persons with a final value which depends on the amount of contaminant exposure a food product encountered during its supply chain. Extraneous factors at certain nodes may also be provided, permitting a more in depth self-analysis by a consumer if warranted. To keep all the information provided from each node in a clear, concise manner, a system may utilize a blockchain. This form of decentralized network may provide a more secure method for information sharing than conventional techniques. For example, since a blockchain cannot be edited by a single entity, once information from a node is uploaded it can be trusted to not be altered.

FIG. 1 illustrates a method for tracking a food product throughout the supply chain of the food product. At 101, a system may obtain information corresponding to possible extraneous factors on a food product. Extraneous factors are those factors that are based upon the environment of the food product. Example extraneous factors may include pesticides, soil pH, temperature, humidity, amount of light, air quality, vibration, and any other factor that may affect the quality of the food product or that may identify a contamination of the food product. The extraneous factors may be obtained from one or more sources, which may include direct and indirect sources. A direct source may be a sensor, device, manual input by a person, or the like, that provides exact information regarding the extraneous factor. For example, a temperature sensor may provide temperature readings regarding the soil and the surrounding environment. An indirect source may be a newspaper, Internet source, hospital records, or the like, that may provide information that allows inference of an extraneous factor. For example, a newspaper may provide a story about a drought that is occurring within a region. From this the system can infer that the soil condition is dry.

A cognitive engine may collect different forms of data that may play a part in contamination of a food product. The cognitive engine may collect extraneous factor information in real-time from multiple sources, for example, by utilizing Internet connections, cloud storage, and the like. The data collected may include temporal data, textual data, discrete data, and the like. Temporal data may include data that are based upon a particular time, for example, information pertaining to weather data. Inclement weather may cause a food product to encounter possible forms of contamination in a variety at situations. For example, a watermelon may need a long, warm season to grow and reach its full potential. A drastic change in temperature may not only affect the yield of watermelons to be produced, but may also contribute to the biological make-up of a watermelon and the production of an unhealthy product. Occurrences such as heavy rain or possible flooding of a watermelon patch may also contribute to contamination exposure to the food product, as water may carry harmful materials into an area of cultivation. Weather data may also be taken into consideration during transportation, for example, the vehicle in which the food product is transported may face severe weather, or extending the length of a trip may not be suitable for a food product for a given amount of time. The weather may affect the storage phases of a supply chain also. For example, if a watermelon needs to be stored in a cooler at a certain temperature and a very hot day arises, a cooler may not be able to maintain a specific temperature, thus spoiling some product and releasing bacteria into a storage unit. Weather may also have a similar effect on a product when sitting on a shelf in a grocery store.

Textual data may be data that are pulled from textual secondary sources. For example, textual data may include, information including, but not limited to, possible health outbreaks, scientific research, crowd-sourced data, and the like. To be successful in cultivation, multiple factors must be at specific values to produce a clean, well-raised product. With the success rate being directly correlated to specific growing variables, pollutants of all kinds may drastically alter the outcome during cultivation. A cognitive engine is used to collect textual data to help avoid encounters with pollutants. For example, an Ebola outbreak may prevent an agriculturist who grows lettuce from not producing lettuce for a certain amount of time. Also, information about people growing ill after consumption may cause an agriculturalist to produce less of a food product until the reason behind the occurrence is made clear. The use of crowd-sourced data may assist agriculturists in determining which food products to produce the most of and which the least. Textual data may also be used in, but not limited to, determining the best route for travel during the transportation process, notifying a storage unit of new storage information regarding increased life of a food product, determining where in a grocery store a food product should be located to maximize sales, and the like.

Discrete data may include data provided by sensors or other devices that can provide direct measurements of an extraneous factor. Discrete data such as water index quality, land index quality, and air index quality are each important to the cultivation process. In cases where any of these three indexes fall below a certain threshold value, or become unhealthy, production of a food product may also decrease. Additionally, the use of discrete data may lead agriculturalists in the correct direction when determining where the highest yield of a product may be produced. Since these three particular indexes are crucial for a successful crop, any variation in any of these indexes may be detrimental to producing a successful yield. Water may be present at each node of a supply chain because certain products require storage in, or exposure to, water at predetermined time intervals to remain healthy. Thus, if the water index indicates that the water quality is below a healthy threshold value, the food quality may degrade. The land quality index may determine where a food product may and may not be stored. Based on the chemical makeup of the soil in a particular region, some food products may become unhealthy in a certain environment, especially those food products being stored on the ground. Thus, if the land quality index indicates a lower than desired value, the food quality may degrade. Since the air quality affects everything (all products are exposed to air), the air quality index for every node may be recorded to determine if a food product was or will be exposed to any contaminants.

Pollutants may be easily transmitted via air or water, thereby contaminating products quickly but also dissipating more quickly than land pollutants. On the other hand, pollutants in the land may take an elongated amount of time to dissipate, thereby contaminating products for an extended period of time as compared to the air and water pollutants. Each index remains a factor throughout the supply chain, and may be measured at each node. This may help to keep the amount of pollutants present in a supply chain at a minimal level.

The system may determine what extraneous factors to record or obtain based upon a category of the step within the supply chain. For example, if the food product is being transported, the system may not record information related to the land quality index at all locations along the transportation route since the food product is not exposed to the land when being transported on a vehicle. Thus, the system may categorize the supply chain step (e.g., transportation, cultivation, storage, end-location, etc.) and, from this categorization, determine which extraneous factors could affect the quality of the food product. The system may then only obtain these extraneous factors for that category of the supply chain.

At 102, a system may generate a rating at each node indicating the pollution level to which a food product may have been exposed during that node of the supply chain. In other words, for each step in the supply chain, the system may generate a rating indicating the level of pollution at that step. Each extraneous factor recorded at a node may indicate some level of pollution or contamination to which a product may have been exposed. For each extraneous factor recorded, a score/rating may be produced describing the severity of an encounter of a product to a possible contamination source. Thus, the system scores the extraneous factor with the score identifying a pollution or contamination effect on the food product. As mentioned previously, contamination sources may come in different forms and may drastically affect the health of a product. In producing the rating for each node, a cognitive engine may calculate the extraneous factor score with respect to each extraneous factor found at a node, and then may determine an overall extraneous impact rating for each node.

Generating a rating may occur over a predetermined geo-spatial reading; in other words, a node is the predetermined geo-spatial location. The extraneous impact rating is a combination of each extraneous factor score measured at a particular node. In other words, once a score is created for each extraneous factor within a supply chain step or node, the system may aggregate the scores into a single node quality score. When calculating any form of score or rating, a cognitive engine may use a machine learning algorithm which may be trained to assess the impact of extraneous factors on a food product. For example, the machine learning algorithm may identify that a land quality score has a low impact on the food product during a transportation step. As another example, the machine learning algorithm may identify that a water quality score has a high impact on the food product during a cultivation step. Thus, in aggregating the extraneous factor scores, each of the scores may be weighted based upon the machine learning algorithm. In an embodiment, the cognitive engine may use a machine learning algorithm to evaluate the extraneous factors across all nodes present in a food supply chain. The machine learning algorithm helps ensure that accuracy of the extraneous factors is consistent across all nodes. The values produced for the extraneous factors found at each node are then provided to a blockchain. Since information present on a blockchain can only be edited when consent is given by at least two users of the blockchain, the information provided to a blockchain is secure and accurate.

Once each extraneous factor is recorded, and an extraneous impact rating is calculated for each node, a cognitive engine may produce an aggregate extraneous impact rating for the entirety of the food supply chain 103. The aggregate extraneous impact rating may indicate a final overall quality value for the food product. In other words, the aggregate extraneous impact rating may describe the total exposure to contamination that a food product may have encountered during the supply chain, thereby providing an indication of the impact of pollution or contamination on the food product across the food supply chain. Depending on the amount of contamination and extraneous factors recorded at each node, the system may weight the contamination influence at each node with respect to the whole food supply chain to help produce an accurate aggregate extraneous impact rating. For example, a transportation step may not affect the food product as much as a storage step. Therefore, the system may identify that the storage step has a higher weighting than the transportation step. It should be understood that the weightings, either at each node or for the overall supply chain, may be different for different food products.

The supply chain weighting can be determined using a machine learning algorithm which may be the same or different than the one used for rating each node. The cognitive engine may also utilize research information specific to a supply chain to assist in weighting and determining which node presented the most extraneous factors or effect on a food product. A node that has the most number of extraneous factors may be weighted the highest, while the node having the least number of extraneous factors may be weighted the lowest. The forms of contamination may also be taken into account when weighting the nodes in determining an aggregate score, because certain chemicals may be more harmful than others. The organizational strategies apparent with the use of blockchain may present a cognitive engine with the necessary data to produce an accurate aggregate extraneous factor rating.

The system may then determine whether a quality rating can be produced for the food product at 104. Determining whether a quality rating can be determined may include identifying whether enough information has been provided to identify an accurate quality rating. For example, if only a single extraneous factor has been provided, the system may determine that an accurate quality rating cannot be determined. The determination of what constitutes an accurate quality rating may be dependent upon a threshold number of extraneous factors being complete, a threshold number of node ratings being computed, or the like. However, it should be understood that not all extraneous factors have to be recorded before an accurate overall quality rating can be determined. Additionally, not all nodes have to have an associated rating or score before an overall quality rating for the food product can be determined. If a quality rating cannot be produced at 104, the system may notify a user that the rating cannot be produced at 106.

If, however, if the system determines that a quality rating can be produced at 104, the system may produce the quality rating at 105. The system may use the aggregate extraneous impact rating to determine the final quality score for a specific food product. Being that the aggregate extraneous impact rating for a total food supply chain represents the overall possible influence that contamination factors may have on a food product throughout its voyage, a quality score may take into account the aggregate extraneous impact rating, along with identifying different food products within a single food product, when producing a final quality score. In other words, a single food product may be created from multiple food products, each having an aggregate food supply chain score. By identifying each food product within a single food product and using the aggregate score for each food product, the cognitive engine may produce a single aggregate score for the single food product.

The quality rating may be provided to a user if a user requests it example, if a consumer is in a grocery store and scans a barcode included on the food product, the system may provide the quality rating of that food product to the user. As another example, when the food product is provided for sale in a market, the vendor may include a sign or other indication of the quality of the food product based upon the food quality rating. People other than consumer may want to know the quality rating of a food product also. For example, an agriculturist may desire the quality rating to determine if there are any steps in the supply chain that caused contamination. Thus, the quality rating may be used to determine if the food product has been contaminated due to the supply chain. This may also help prevent the spread of illness caused by contamination by allowing for an earlier detection of contamination.

Figure 2:
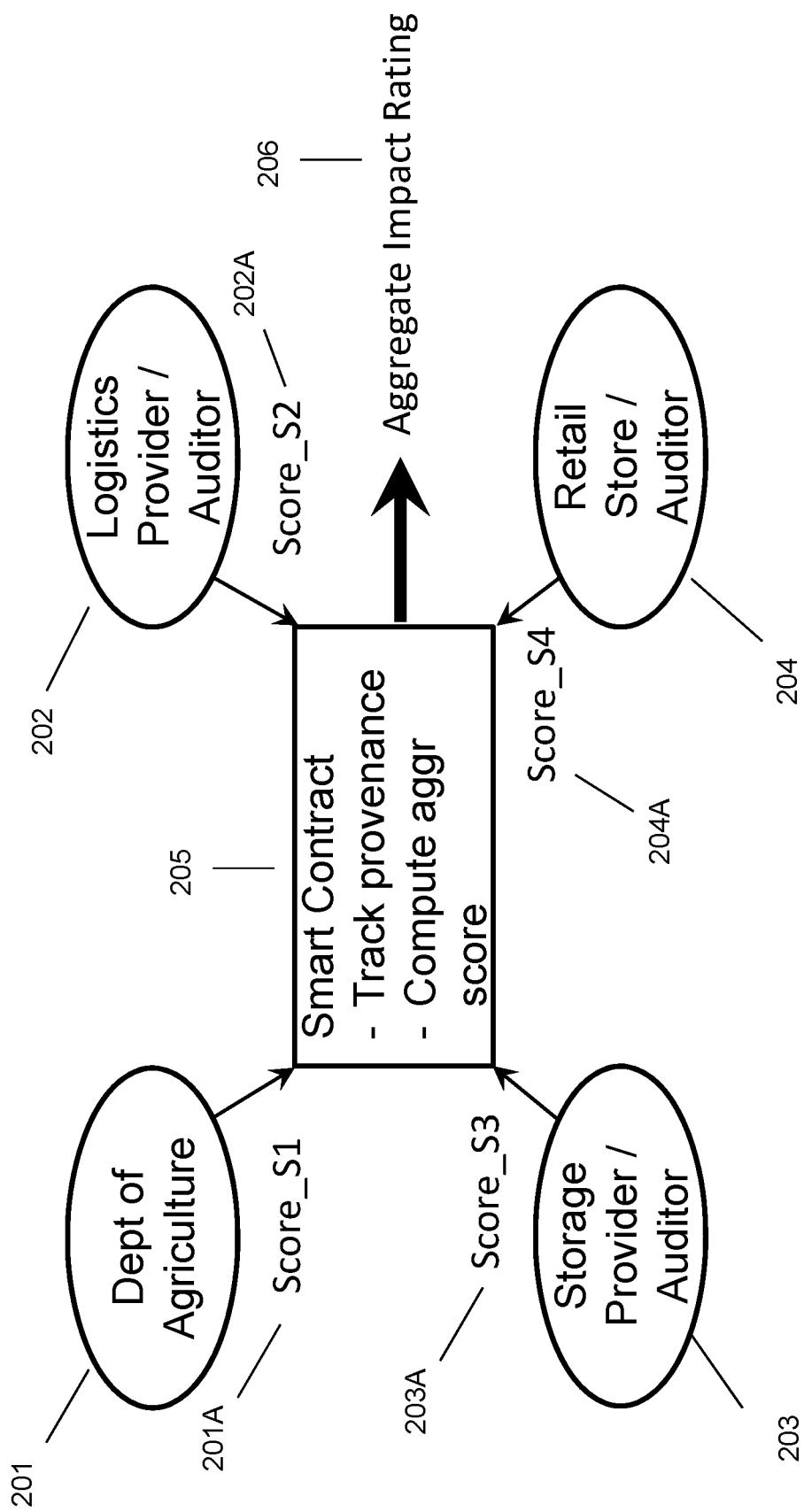
FIG. 2 illustrates a method for utilizing blockchain to produce an aggregate quality score for a food product based upon the supply chain.

FIG. 2 displays an example of how node scores can be aggregated into a supply chain score using the described system, for example, a blockchain. The use of blockchain is becoming common practice in the world of supply chain and logistics. Multiple benefits may come with the use of a blockchain; benefits such as improved trust on information provided from multiple sources and easy implementation and organizational strategies. With supply chains being a global aspect of business, information privacy concerns across jurisdictional boundaries may arise. Privacy issues concerning sharing pollution data and impact on food to a central entity for analysis may be information a country does not want to provide. The use of blockchain allows for partial computation of pollution impact on food by different entities in a supply chain, meaning that the system may move forward with determining a quality score or rating even if only ratings are provided to the system. Thus, the blockchain does not have to identify information regarding specific forms of contaminations or the extraneous factors that resulted in a particular score or rating.

The aggregate supply chain rating 206 can be determined on the blockchain 205. The blockchain can not only keep track of node scores, but can also compute an aggregate score and track the provenance of the food product. For each node within the supply chain 201, 202, 203, and 204 the system obtains extraneous factors and computes a corresponding score 201A, 202A, 203A, and 204A. These scores 201A, 202A, 203A, and 204A are provided to the blockchain 205. For simplicity only four nodes are shown in FIG. 2. However, it should be understood that greater or fewer nodes may be included in the system, different nodes than those shown in FIG. 2 may be included in the system, or the like.

Thus, the described system provides a significant technical improvement to current food product tracking techniques. Rather than merely tracking the provenance of a food product, the system is able to also identify possible sources of contamination or pollution at each step in the supply chain and determine what effect the contamination or pollution may have on the quality of the food product. Additionally, the system provides a technique that allows a consumer or other user to determine the quality rating, which then allows the user to determine whether he/she would still like to purchase the product or whether steps are needed to prevent future contamination. Thus, the described system is a system that provides more information regarding food quality to consumers and other users than conventional techniques. Additionally, since the system can be implemented using a blockchain or cloud storage system, the information can be accessed by anyone, thereby making a more transparent supply chain system than traditional methods.

Figure 3:
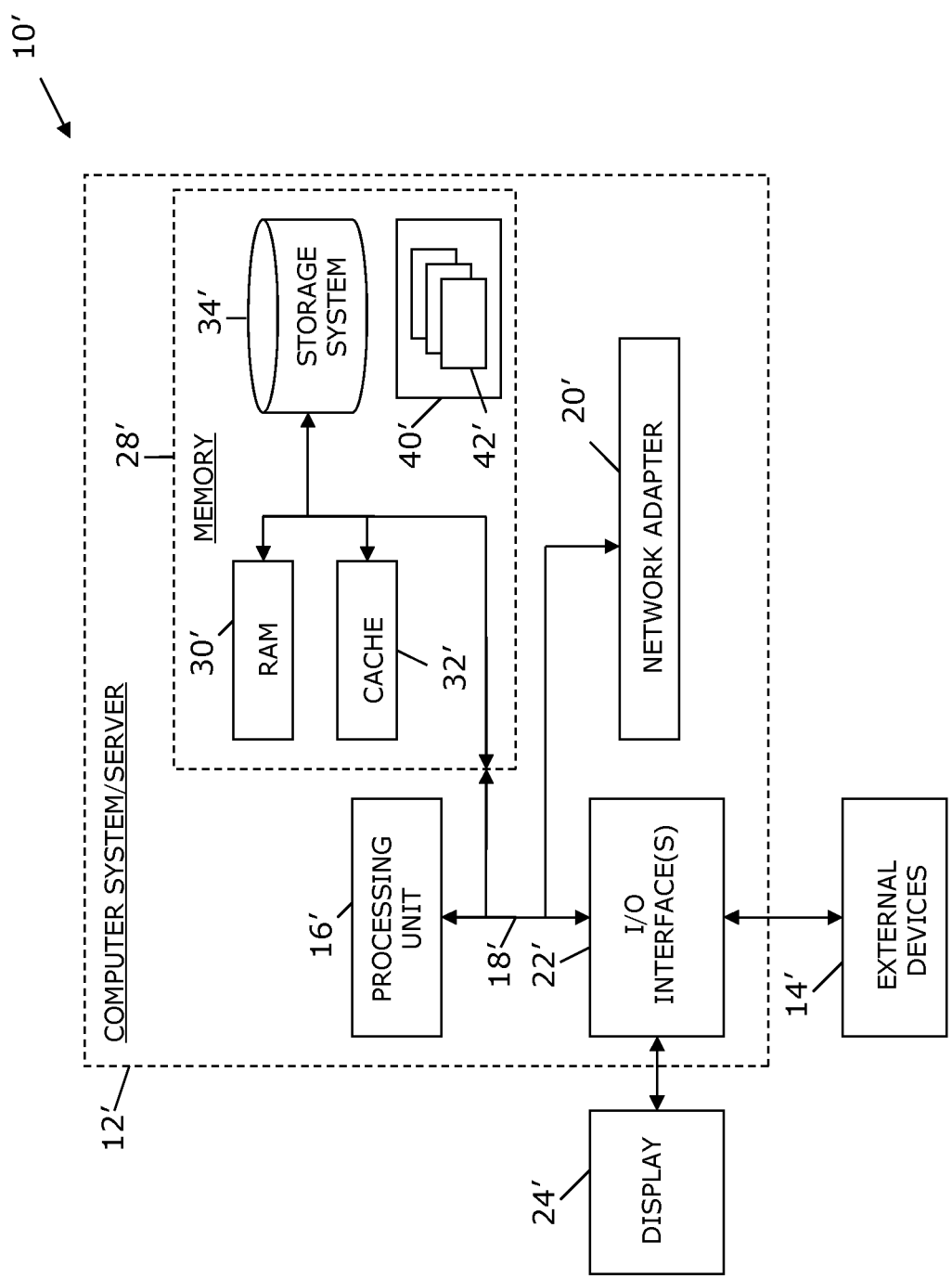
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

obtaining, using a cognitive engine and from a central database accessible by a cognitive engine and for each step in a food supply chain, information corresponding to extraneous factors, wherein the extraneous factors comprise factors that may affect quality of a food product within the food supply chain, wherein the obtaining comprises obtaining information from the central database using a cloud-based network and wherein the central database comprises a blockchain, wherein the information corresponding to the extraneous factors are collected by the cognitive engine in real-time as the food product moves through steps within the food supply chain;

generating, using the cognitive engine, a rating, for each of the steps in the food supply chain and from the information, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors within a corresponding step to determine a rating for the corresponding step, wherein the generating the rating comprises the cognitive engine utilizing a machine learning algorithm, trained to assess an impact of the each of the extraneous factors on the food product within the food supply chain, to evaluate the aggregate scores for the extraneous factors;

generating, using the cognitive engine and using the rating for each of the steps supplied by the cognitive engine over the blockchain, an aggregate food supply chain score for the food product, wherein the aggregate food supply chain indicates an impact of pollution across the food supply chain on the food product, wherein the generating the aggregate food supply chain score comprises using a machine learning algorithm trained to assess the impact of extraneous factors on food products; and producing a quality rating for the food product, wherein the quality rating is based upon the assessed impact of pollution and indicates a quality of the food product with respect to the food supply chain, wherein the quality rating is stored on the blockchain.

2. The method of claim 1, wherein the generating a rating comprises generating a rating for a predetermined geo-spatial location.

3. The method of claim 1, wherein the extraneous factors for each step are selected based upon a category of the step within the food supply chain.

4. The method of claim 1, wherein the generating an aggregate food supply chain score comprises weighting each of the ratings generated for the steps.

5. The method of claim 1, comprising providing the quality rating to a user in response to receiving a quality rating request from the user.

6. The method of claim 1, comprising detecting contamination of a food product based upon the obtained information and the aggregate food supply chain score.

7. The method of claim 1, wherein the producing a quality rating comprises (i) identifying different food products within a single food product and (ii) aggregating the quality ratings for each of the different food products based upon a proportion of the corresponding food product within the single food product.

8. The method of claim 1, wherein the information is obtained from at least one of: news data, crowd-sourced data, hospital records, water quality index, land quality index, and air quality index.

9. An apparatus, comprising:
at least one processor, and
a computer readable storage medium having computer readable program code embodied therewith and executable by the at least one processor, the computer readable program code comprising:
computer readable program code configured to obtain, using a cognitive engine and from central database accessible by a cognitive engine and for each step in a food supply chain, information corresponding to extraneous factors, wherein the extraneous factors comprise factors that may affect quality of a food product within the food supply chain, wherein the obtaining comprises obtaining information from the central database using a cloud-based network and wherein the central database comprises a blockchain, wherein the information corresponding to the extraneous factors are collected by the cognitive engine in real-time as the food product moves through steps within the food supply chain;
computer readable program code configured to generate, using the cognitive engine, a rating, for each of the steps in the food supply chain and from the information, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors within a corresponding step to determine a rating for the corresponding step, wherein the generating the rating comprises the cognitive engine utilizing a machine learning algorithm, trained to assess an impact of the each of the extraneous factors on the food product within the food supply chain, to evaluate the aggregate scores for the extraneous factors;
computer readable program code configured to generate, using the cognitive engine and using the rating for each of the steps supplied by the cognitive engine over the blockchain, an aggregate food supply chain score for the food product, wherein the aggregate food supply chain indicates an impact of pollution across the food supply chain on the food product, wherein the generating the aggregate food supply chain score comprises using a machine learning algorithm trained to assess the impact of extraneous factors on food products; and
computer readable program code configured to produce a quality rating for the food product, wherein the quality rating is based upon the assessed impact of pollution and indicates a quality of the food product with respect to the food supply chain, wherein the quality rating is stored on the blockchain.

10. A computer program product, comprising:
a computer readable storage medium having computer readable program code embodied therewith, the computer readable program code executable by a processor and comprising:
computer readable program code configured to obtain, using a cognitive engine and from a central database accessible by a cognitive engine and for each step in a food supply chain, information corresponding to extraneous factors, wherein the extraneous factors comprise factors that may affect quality of a food product within the food supply chain, wherein the obtaining comprises obtaining information from the central database using a cloud-based network and wherein the central database comprises a blockchain, wherein the information corresponding to the extraneous factors are collected by the cognitive engine in real-time as the food product moves through steps within the food supply chain;
computer readable program code configured to generate, using the cognitive engine, a rating, for each of the steps in the food supply chain and from the information, indicating a level of pollution to which the food product was exposed at the corresponding step, wherein the rating comprises (i) scoring each of the extraneous factors based upon a level of pollution identified from the extraneous factors and (ii) aggregating the scores for the extraneous factors within a corresponding step to determine a rating for the corresponding step, wherein the generating the rating comprises the cognitive engine utilizing a machine learning algorithm, trained to assess an impact of the each of the extraneous factors on the food product within the food supply chain, to evaluate the aggregate scores for the extraneous factors;
computer readable program code configured to generate, using the cognitive engine and using the rating for each of the steps supplied by the cognitive engine over the blockchain, an aggregate food supply chain score for the food product, wherein the aggregate food supply chain indicates an impact of pollution across the food supply chain on the food product, wherein the generating the aggregate food supply chain score comprises using a machine learning algorithm trained to assess the impact of extraneous factors on food products; and
computer readable program code configured to produce a quality rating for the food product, wherein the quality rating is based upon the assessed impact of pollution and indicates a quality of the food product with respect to the food supply chain, wherein the quality rating is stored on the blockchain.

11. The computer program product of claim 10, wherein the generating a rating comprises generating a rating for a predetermined geo-spatial location.

12. The computer program product of claim 10, wherein the extraneous factors for each step are selected based upon a category of the step within the food supply chain.

13. The computer program product of claim 10, wherein the generating an aggregate food supply chain score comprises weighting each of the ratings generated for the steps.

14. The computer program product of claim 10, wherein the producing a quality rating comprises (i) identifying different food products within a single food product and (ii) aggregating the quality ratings for each of the different food products based upon a proportion of the corresponding food product within the single food product.

15. The computer program product of claim 10, wherein the information is obtained from at least one of: news data, crowd-sourced data, hospital records, water quality index, land quality index, and air quality index.

16. A method, comprising:

obtaining, using a cognitive engine and from one or more sources, information identifying factors related to an environment of a food product within a supply chain, wherein the factors may affect the quality of a food product within a supply chain, wherein the obtaining the information comprises obtaining information from the one or more sources using a cloud-based network and wherein the factors are stored in a central database comprising a blockchain, wherein the information identifying the factors are collected by the cognitive engine in real-time as the food product moves through steps within the supply chain;

producing, using the cognitive engine and from the information, a rating indicating a level of pollution to which the food product was exposed for each of the steps within the supply chain, wherein the rating comprises (i) scoring each of the factors based upon a level of pollution identified with the environment from the information and (ii) aggregating the scores for the factors within a corresponding step to determine a rating for the corresponding step, wherein the generating the rating comprises the cognitive engine utilizing a machine learning algorithm, trained to assess an impact of the each of the factors on the food product within the supply chain, to evaluate the aggregate scores for the factors;

generating, using the cognitive engine, an aggregate food supply chain score for the food product from the ratings for the steps within the supply chain, wherein the aggregate food supply chain score indicates impact of pollution on the food product across the supply chain, wherein the generating the aggregate food supply chain score comprises using a machine learning algorithm trained to assess the impact of extraneous factors on food products; and generating a provenance for the food product, wherein the provenance comprises (i) a quality rating for the food product based upon the aggregate food supply chain score and (ii) information indicating pollution of the food product across the food supply chain, wherein (i) the quality rating and (ii) the information indicating pollution is stored on the blockchain.

* * * * *